United States Patent [19]

Kimoto

[11] Patent Number: 4,524,417
[45] Date of Patent: Jun. 18, 1985

[54] TIMING SIGNAL CONTROLLED INFORMATION PROCESSING SYSTEM

[75] Inventor: Manabu Kimoto, Tokyo, Japan

[73] Assignee: Nippon Electric Co., Ltd., Tokyo, Japan

[21] Appl. No.: 342,086

[22] Filed: Jan. 25, 1982

[30] Foreign Application Priority Data

Jan. 23, 1981 [JP] Japan ................................. 56-8627

[51] Int. Cl.³ .............................................. G06F 3/04
[52] U.S. Cl. .................................................. 364/200
[58] Field of Search ............................. 364/200, 900

[56] References Cited

U.S. PATENT DOCUMENTS

| | | | |
|---|---|---|---|
| 3,910,322 | 10/1975 | Hardesty, Jr. et al. | 364/200 |
| 4,075,691 | 2/1978 | Davis et al. | 364/200 |
| 4,075,692 | 2/1978 | Sorensen et al. | 364/200 |
| 4,162,536 | 7/1979 | Morley | 364/200 |
| 4,271,466 | 6/1981 | Yamamoto et al. | 364/200 |
| 4,292,669 | 9/1981 | Wollum et al. | 364/200 |
| 4,313,162 | 1/1982 | Baun et al. | 364/200 |
| 4,325,119 | 4/1982 | Grandmaison et al. | 364/200 |
| 4,346,474 | 8/1982 | Sze | 364/200 |
| 4,390,947 | 6/1983 | DeShun | 364/200 |

Primary Examiner—Gareth D. Shaw
Assistant Examiner—Jameson Lee
Attorney, Agent, or Firm—Laff, Whitesel, Conte & Saret

[57] ABSTRACT

An information processing system has a bus for providing information transmission, which is received at an external terminal. An input/output circuit is coupled between the bus and the external terminal for effecting the information transmission therebetween. A first control signal controls the timing of the input/output circuit so that the information may be transmitted from the bus to the external terminal. A second control signal controls the timing of the input/output means so that the information may be transmitted to the bus. A third control signal has a timing which is different from both the first and the second control signals so that the information may be transmitted through the input/output circuit. Timing control means selectively applies the first or second control signal and then the input/output circuit operates in accordance with the third control signal.

6 Claims, 3 Drawing Figures

TIMING SIGNAL CONTROLLED INFORMATION PROCESSING SYSTEM

BACKGROUND OF THE INVENTION

1. Field of the Invention

The present invention relates to an information processing system and, more particularly, to an information processing system which is made operative to execute an instruction under the control of timing signals.

2. Description of the Prior Art

A computer is an example which is reprentative of such an information processing system. As is well known in the art, the computer is constructed so that it reads an instruction out of a memory and executes the processing operation in accordance with the instruction which is read out. In the execution of the instruction which is, a decoder first decodes the instruction read out and, responsive thereto, generates a variety of control signals. The control signals thus generated are required for an instruction executing unit (e.g., a central processing unit, "CPU") to execute the instruction and are prepared in accordance with the instruction which are read out. Those control signals include many signals such as signals for fetching the information to a register, signals for controlling the conduction and non-conduction of a gate, signals for writing and reading the information into and out of an input/output port, signals for reading the information out of a memory or register, or signals for controlling the execution of logic arithmetic such as addition or subtraction.

These control signals are usually generated simultaneously, from a decoder. If the generated control signals are simultaneously fed to respective circuits, however, a disturbance never fails to occur in the information, thereby to invite a malfunction of the computer. Therefore, the sequence has to be controlled so that the control signals are fed to the respective circuits in accordance with the execution sequence of the instruction. For this reason, timing signals are used. These timing signals are generated at a predetermined time interval by dividing the frequency of the clock pulses having the maximum frequency, and the divided signals are usually called the "status signals".

The executions of the respective instructions are designed so that the sequence of control is effected by a plurality of status signals, and the set of that plurality of status signals are called the "machine cycle". In other words, it can be said that the instructions are executed with reference to the machine cycle. Therefore, the respective instructions are defined as 1 machine cycle instruction, 2 machine cycles instruction and so on in accordance with the length of the time period which is required for their executions. If the 1 machine cycle is composed of four status signals, eight status signals are required to execute the 2 machine cycles instruction.

The aforementioned control signals have their timings controlled by those status signals and are fed to the respective circuits. As a result, the CPU can correctly execute the respective instructions on the basis of the control signals (i.e., the decoder outputs), which have their timings controlled. Incidentally, the status signals can also be used as the timing control signals for not only the CPU, but also in either the memory or the input/output port. Moreover, the timing control of the computer is fixed by those status signals.

However, the timing control by the status signals have disadvantages as will be described in the following specification. Specifically, since the computer has its timing control fixed by the status signals, the timing control in the cooperation with another device is remarkably complex. It is very difficult to control all the devices, which are to be coupled to the computer, with the same timing that is used to control the computer. This is because the operating speeds of the respective devices are generally different. Thus, to control all the devices with an identical timing requires an adjustment of all operating speeds to conform to the device having the slowest operating speed. However, this remarkably reduces the processing speed to make it impossible to satisfy the requirement for the high speed processing operation.

Moreover, a computer such as a microcomputer, which is constructed on a small semiconductor chip by the use of a circuit integrating technique, cannot be equipped with many external terminals for information transmission. Therefore, the computer of that kind has to be coupled by the use of a limited number of terminals to another device such as another microcomputer, a memory or a peripheral device such as a key board or a display device. In this case, the timing control of either the microcomputer or a system (e.g., a multi-processor system) including a microcomputer is a remarkably difficult and important problem.

Moreover, the development of the microcomputer is escalating. Especially, the single chip microcomputer in all of the functions of a computer, such as the memory function, the instruction executing function or the input/output function of data are incorporated into a single silicon substrate. The enlargement of the kinds of the instructions to be executed by such a microcomputer, as well as the memory capacity and the input/output function are abruptly advanced in accordance with the progress of a super LSI technique.

Therefore, as the microcomputer has its function thus improved and its hardware circuit made more complicated, its testing mechanism naturally raises a problem. Especially, the single chip microcomputer cannot unlimitedly increase the number of the input and output terminals to be used for the data transmission with the external devices. In addition, most of those terminals have to be assigned as ports for information transmission. As a result, it is remarkably difficult to provide for the tests such as the confirmation of the instruction execution or the function confirmation of the internal memory.

According to the prior art, there is a first method, in which the test instruction for the operation confirmation of an executing unit and memories is preset in a predetermined area of a read only memory being used as a program memory (which will be referred to as a "program ROM"). The test instruction is a program (i.e., an instruction group) for performing the test of the executing unit and the memories.

A second method uses the same terminal for the information transmission with the outside (i.e., the input/output port) and for the testing terminal so that the aforementioned test instruction can be given from the outside.

According to the first method, however, a partial area of the program ROM is occupied for setting the testing instruction. Thus, there arises a disadvantage in that the number of instructions to be set in the memory for the program processing operation is reduced. It can be predicted without fail that the numbers of the program processing instructions and the testing instructions will be increased, especially in accordance with the enlargement of the processing function. In this case, the reduction in the instruction numbers appears as a remarkably large disadvantage.

According to the second method, on the other hand, since the input/output port for the information transmission is used as an input port for the test instruction, its intrinsic function is lost. In short, it has been impossible to confirm the input and output operations of that port.

Especially, it has been impossible to execute the input and output instructions to test whether or not information can be correctly fed from the input/output port and whether or not the information can be fed to the input/output port. In order to execute those tests, the control signals based upon the input/output instructions and their timing signals (i.e., the status signals) have to be fed under a predetermined condition to the input/output port. However, since the input/output port is used as an input for the test instruction, it has become impossible to receive the control signals having their timings controlled by the status signals.

SUMMARY OF THE INVENTION

It is, therefore, an object of the present invention to provide an information processing system which is enabled to control the timing with signals other than predetermined timing signals.

Another object of the present invention is to provide an information processing system which receives a signal from the outside, as a timing signal, and executes an instruction on the basis of that signal.

Still another object of the present invention is to provide an information processing system which is enabled to control the timing of an instruction execution, by the use of both the timing signal generated at the inside and the signal fed from the outside.

A further object of the present invention is to provide an information processing system which is enabled to receive a test instruction from an input/output port without losing the intrinsic function of that input/output port.

A further object of the present invention is to provide an information processing system which executes the information transmission at a high speed.

A further object of the present invention is to provide an information processing system which is equipped with a simplified test circuit.

According to the present invention, an information processing system comprises a bus for information transmission and an external terminal for information transmission; input. The output means is coupled between the bus and the external terminal for effecting the information transmission. Either a first or a second control signal is generated for controlling the timing of the input/output means. The first signal controls the information transmitted from the bus to the external terminal and the second signal controls the timing of the input/output means so that the information may be transmitted from the external terminal to the bus. A third control signal is fed to input/output means at a timing, which is different from the timing of the first or second control signal to control the input/output means so that the information may be transmitted therethrough.

The information processing system, according to the present invention, is further equipped as a timing control means for the input/output means. The execution of the information transmission is carried out responsive to the generation of the first or second control signal generated from the timing control means. Another control means is provided for controlling the timing of the input/output means in accordance with the third control signal. The first or second control signal is generated by an instruction decoder and by a status signal generator, which are made operative to generate the control signals on the basis of the input/output instructions, in accordance with the prior art. In other words, the first or second control signal is a signal which is generated at a timing which is determined on the basis of the instruction. On the other hand, the control means is newly provided according to the invention. The third control signal is fed to the input/output means, similar to the first or second control signal to control the input/output means in a similar manner. Nevertheless, the timing to be fed to the input/output means is different from that of the first or second control means. For example, it is assumed that the 1 machine cycle contains four status signals $T_1$ to $T_4$. If the first control signal is fed to the input/output means in synchronism with the status signal $T_4$, the control means operates so that the third control signal is fed to the input/output means in synchronism with the other status signals such as the status signal $T_2$ or $T_1$.

As a result, the third control signal can be fed to the input/output means separately of and at a faster timing than that of the first control signal which is generated at a timing determined in accordance with the instruction.

The information can be transmitted at an early stage. In other words, the transmission can be executed at a high speed. Naturally, the third control signal can be generated at an arbitrary timing, merely by changing a logic circuit. Moreover, the test instruction is fed from the external terminal to the bus by the use of the third control signal. The test results can be extracted from the input/output means by the use of the first control signal. As a result, the test can be performed without losing the intrinsic function of the input/output means. Moreover, if the third control signal is fed from an external device, the information transmission of the information processing system of the present invention can be controlled by the external device. Furthermore, the third control signal is not superposed upon the first or second control signal. Hence, the information or the instruction can be fed from the outside. Or, the information can be fed to the outside separately of the processing operation of the information processing system, according to the present invention. Thus, the information processing system of the present invention has a large effect in the multiprocessor system.

DESCRIPTION OF THE PREFERRED EMBODIMENT

Figure 1:
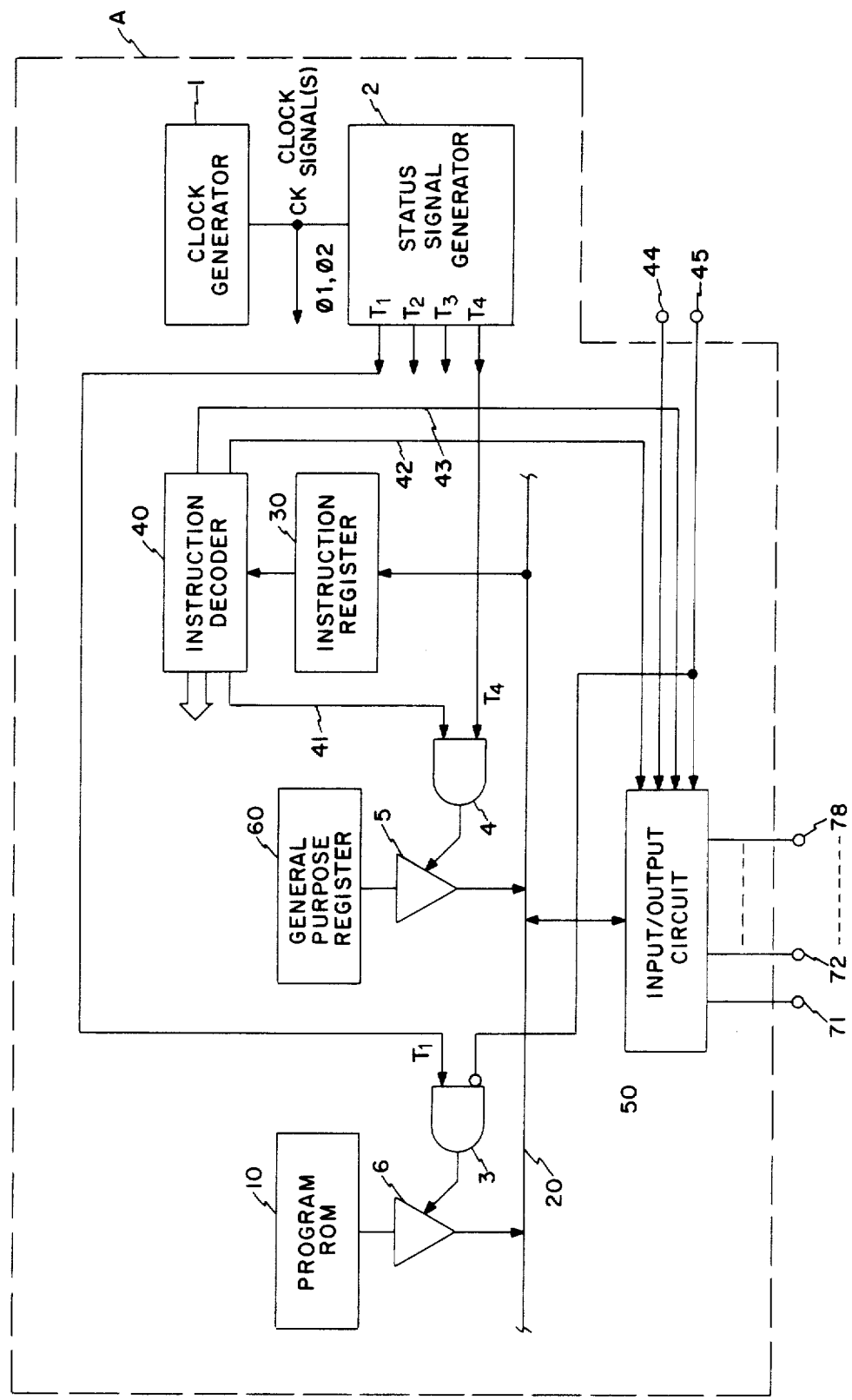
FIG. 1 is a block diagram showing an essential portion of a microcomputer according to one embodiment of the present invention.

FIG. 1 is a block diagram showing an essential portion of a microcomputer, according to one embodiment of the present invention. The microcomputer A is equipped as timing signal generating means with both a clock generator 1 for generating clock signals (CK) $\phi_1$ and $\phi_2$ having the maximum frequency. A status signal generator 2 generates four predetermined status signals $T_1$ to $T_4$, by dividing the frequencies of the clock signals CK. In this embodiment, 1 machine cycle is constructed of the four status signals $T_1$ to $T_4$. These status signals may be in one number but are generally four or five in number for a conventional microcomputer.

The microcomputer A is further equipped with a program ROM 10, in which instructions are stored. An instruction register 30 temporarily fetches the instruction read out of the program ROM 10. An instruction decoder 40 decodes the instruction fetched by the instruction register 30, to feed out a control signal. A general purpose register 60 is used for the execution of the instruction, and an input/output circuit 50 is coupled to external terminals 71 to 78 for executing the information transmission with the outside. The microcomputer A may have other units (not shown), such as: an arithmetic logic unit (i.e., ALU), a random access memory (i.e., RAM), an accumulator, a flag, and so, built therein in addition to the aforementioned elements.

The elements, through which the information is fed in and out, such as the program ROM 10, the instruction register 30, the general purpose register 60 or the input/output circuit 50 are coupled to an internal data bus 20. This internal bus 20 is constructed of a plurality of signal lines (e.g., four or eight) in accordance with the number of the bits to be processed. Moreover, the elements, which have a function to feed the information to the internal bus 20, such as the program ROM 10 or the general purpose register 60 are equipped at their output stage with buffers 6 and 5. These buffers 6 and 5 have their conductivity controlled by the outputs of AND gates 3 and 4. The AND gate 3 is fed with both the status signal $T_1$ and a signal which is prepared by inverting the signal fed from an external terminal 45. The other AND gate 4 is fed with both the status signal $T_4$ and a control signal on wire 41 which is fed from the instruction decoder 40. Here, the status signals $T_1$ to $T_4$ are assumed to be generated in the order of $T_1$, $T_2$, $T_3$ and $T_4$.

In the example under consideration, the instruction of the program ROM 10, which was made by the address, is read out when the status signal $T_1$ is generated. The information set in the general purpose register 60 is read out when the status signal $T_4$ is generated. Thus, the respective elements have their timings controlled so that the transmission of the information may not be executed as long as the status signals are not generated, even if these elements receive the control signal. As a result, the sequence of the instruction execution is correctly controlled.

The sequence of the instruction execution, which has its timing controlled by the status signals, will be described in the following specification. For example, during the generation period of the first status signal $T_1$, the program ROM 10 is addressed, and the assigned instruction is set in the instruction register 30. During the generation period of the second status signal $T_2$, this signal $T_2$ is decoded by the instruction decoder 40, either to generate the various control signals or to prepare the memory address of the instruction to be subsequently read out. During the generation period of the third status signal $T_3$, the decoded instruction (e.g., an arithmetic instruction, an interrupt instruction or an information transmission information) is executed. During the generation period of the fourth status signal $T_4$, the executed results are either transferred to the outside or stored in an internal RAM (although not shown). The execution is shifted to the subsequent instruction in response to the generation of the subsequent new status signal $T_1$ of a next machine cycle. Thus, the information processing system of the present invention is made operative to execute the instructions on the basis of the timings which are determined by the status signals.

In FIG. 1, the instruction (of a binary code type), is written in advance in the program ROM 10, and is extracted and applied to the internal data bus 20 through the buffer 6, which is activated by the output signal from the AND gate 3. This instruction is fetched from the ROM 10 and put into storage in the instruction register i.e., IR 30 (during the period of the status signal $T_1$. The instruction codes, which are fetched into the instruction register IR 30, are decoded by the instruction decoder 40 so that the various control signals are generated at suitable timings.

Here, the terminology "suitable timings" implies that all of the control signals need not be simultaneously fed out. The instruction to be read a plurality of times from the program ROM or the instruction having a number of decode outputs (i.e., control signals), such as the 2 machine cycles instruction or the 3 machine cycles instruction leads to a generation of the control signals, divided into a plurality of groups. Even in this case, however, that instruction needs to be subjected to the timing control by the status signals. As a result, even if their output timings are different, the control signals are fed to the respective elements during predetermined time periods.

As an example of the instructions to be executed by the information processing system, the following description is directed to the output instruction for causing the content temporarily stored in the general purpose register 60 to be fed through the input/output circuit (which will be called an "I/O port") to the terminals 71 to 78. First of all, the output instruction is read out of the program ROM 10 and is decoded by the instruction decoder 40. This results in the generations of both the control signal on wire 41 for commanding a feeding of the content of the general purpose register 60 to the internal bus 20 and a signal on wire 42 for controlling the terminals 71 to 78 of the I/O port 50 as the output terminals. These executions are effected during the generation period of the status signal $T_4$. The port 50 is made operative to feed the content of the register 60 out the external terminals 71 to 78. This content is transmitted through the buffer 5 when it is activated by the output signal from the AND gate 4. Incidentally, the timing controls may occasionally use not only the status signals but also the clock pulses $\phi_1$ and $\phi_2$.

On the other hand, the information processing system thus constructed has to be tested to determine whether or not the instruction is memorized without error in the program ROM 10, whether or not the CPU executes the correct arithmetic, and whether or not the data are correctly read out of the register. According to the prior art, as has been described hereinbefore, either the testing data have had to be preset in the ROM 10, or the I/O port has had to be used exclusively for the input of the test mode. As a result, the prior art has had disadvantages because the capacity of the ROM is uselessly reduced and because the I/O port itself cannot be tested. Especially, in the test of the I/O port 50, it is necessary to inspect whether or not that port 50 is correctly controlled by the input/output control signals which are generated at predetermined timings.

In the embodiment under consideration, the input/output control signals are to be fed to that port 50 during the predetermined status signal generation period. These signals can be used without any for controlling the port 50 by feeding the control signals via the external terminals 44 and 45. Moreover, the transmission of the information (at terminals 71–78 includes the test signal which are transmitted to the outside at a timing which is different from the generation tiing of those input/output control signals. In other words, the present embodiment is constructed so that the input/output control operations of the I/O port and the testing operations are made coactive with the use of a simple circuit.

Figure 2:
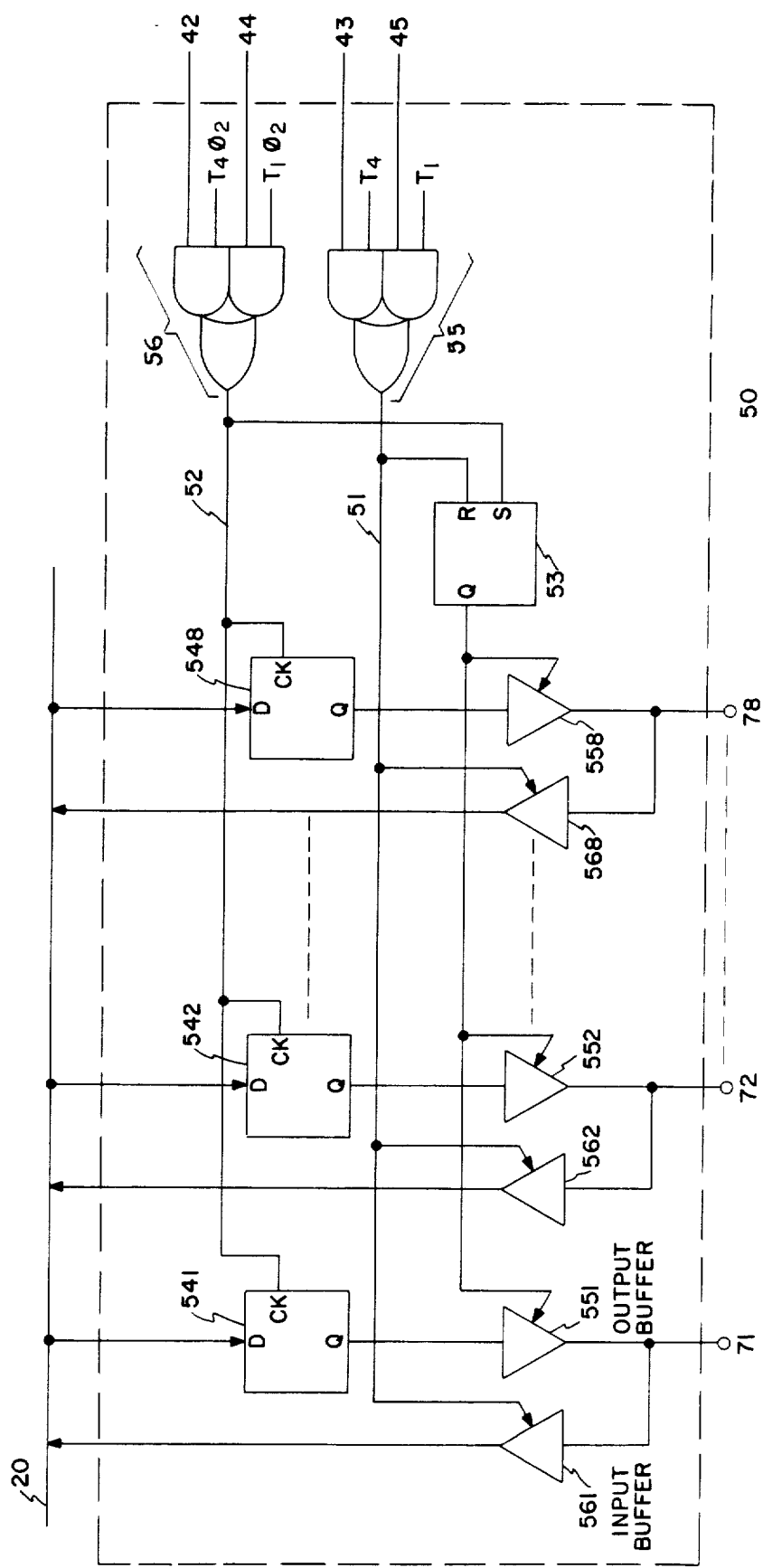
FIG. 2 is a logic circuit diagram showing, in detail, an input/output circuit which is also shown in FIG. 1.
Figure 3:
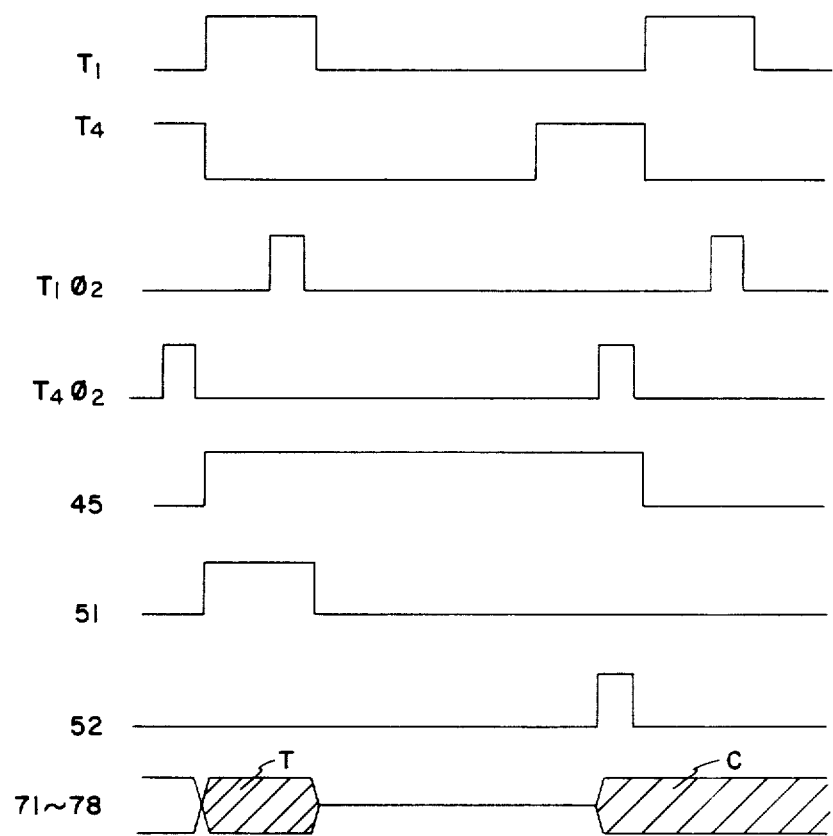
FIG. 3 is an operating timing chart of the microcomputer of FIG. 1 when it is tested.

One embodiment of the I/O port thus constructed is shown in FIG. 2. Moreover, the operation timing chart during the testing operations is illustrated in FIG. 3.

The procedures for testing the microcomputer according to the present embodiment will be described in the following with reference to FIGS. 2 and 3.

First for all, the procedures of feeding an output instruction, as the testing instruction, to the terminals 71 to 78 to confirm the execution of that instruction will be described in the following. Now, if a testing control signal "1" is fed from the terminal 45 of FIG. 2, an input control signal is applied to wire 51 from the gate circuit 55, responsive to the status signal on wire $T_1$. The input control signal 51 resets a flip-flop 53, to control output buffers 551 to 558 in the I/O port, to set the output buffers 551 to 558 at their high impedance sates. Simultaneously with this, the test instruction codes, which are given to the terminals 71 to 78 by input buffers 561 to 568, are fed to the internal bus 20. At this time, the output from the program ROM 10 to the internal bus 20 is prohibited by the gate 3, as not to be generated. This operation is the same as the processing one which is performed during the period of the status signal $T_4$ in case the usual input instruction is to be executed.

Next, the test instruction code transmitted to the internal bus 20 is fetched into the instruction register 30 (FIG. 1). On the basis of that test instruction code, the control signals applied to wires 41 and 42 are generated from the instruction decoder 40. The control signal 42 has its timing controlled by the status signal $T_4$ and the clock $\phi_2$, so that it is fed as an output control signal or wire 52 (FIG. 2) out of a gate 56. The output control signal on wire 52 acts as a signal for setting the content C (FIG. 3) of the general purpose register 60 (FIG. 1), which is read out to the internal bus 20, and stored in output latches 541 to 548. This read out is similar to the status signal $T_4$ and the control signal on wire 41. Simultaneously with this, the flip-flop 53 is set to enable the output buffers 551 to 558 to generate their outputs. Thus, the output operation of the input/output port 50 can be normally executed even during the testing state. The testing operation for the input instruction of the input/output port 50 is easier. It is sufficient for the input data to be fed to the terminals 71 to 78, subsequent to the input instruction.

Next, if the testing control signal "1" is fed from another terminal 44, the output control signal is generated on wires 52 during the generation periods of the status signal $T_1$ and the clock $\phi_2$. Thus, the content of the program ROM 10 (FIG. 1) is fed out to the terminals 71 to 78. As a result, by comparing the codes fed out of the terminals with the instruction codes to be intrinsically written in the program ROM 10, it is possible to check whether or not the instructions are accurately written in the program ROM 10.

As has been described hereinbefore, according to the present embodiment, the signals, which are identical to the control signals to be generated in response to the input or output instruction, can be generated at different timings under the testing conditions. As a result, the tests can be performed without using a portion of the program ROM for the test instruction storage and without losing the function of the input/output port. Moreover, it is sufficient to add the simple circuits (55 and 56) to the port input/output control circuit which is intrinsically owned by the microcomputer itself, and the hardware construction is remarkably simple. Still moreover, it is apparent that the tests other than those for feeding the test instruction (i.e., the mechanical word data) from the terminals to read out the content of the register and those for feeding the content of the program ROM to the terminals, such as, the arithmetic tests or the flag checking tests can be executed without any difficulty.

Furthermore, the input/output port shown in FIG. 2 is remarkably effective not ony during the testing operation but also during the usual program processing operation. Now, the processing operation for feeding the information to the microcomputer from the outside is to be taken into consideration. This processing operation is started with the feed of the information transmission requirement signal to the microcomputer from another device.

According to the prior art, if that requirement signal is received by the microcomputer, the input instructions have to be first read out of the program ROM 10. The read-out control signal is fed to the device having an information to be transmitted to extract that information. Then, this information has to be fed while enabling the input/output port to receive its input. THe processing operation thus far described has taken a considerably long time.

According to the microcomputer having the input/output port shown in FIG. 2, the information can be fed to the inside of the microcomputer during the period of the status signal $T_1$ merely by feeding the signal from the terminal 45 if the requirement signal is received. As a result, the information can be fed at a high speed without elaborately reading out the input instruction from the program ROM 10. Furthermore, if the signal is fed from the terminal 44, control can be made by another device so that the information is fed out of the microcomputer during the period of the status signal $T_1$. As has been described hereinbefore, the present invention is quite effective in the microcomputer system or multi-processor system.

Further, the terminal 44 may be employed for feeding the control signal to the input/output circuit 50 so as either to input only the control signal or to input not only this control signal but also another signal such as a data, an address, an interrupt signal, or the like.

What is claimed is:

1. An input-output interface circuit coupled to an internal bus in a data processing apparatus, said interface circuit comprising:
    at least one first external terminal through which data is transferred;
    first gating means coupled to said internal bus and to said first external terminal for transferring data from said internal bus to said first external terminal in response to a first gating signal;

second gating means coupled to said internal bus and to said first external terminal for transferring data from said first external terminal to said internal bus in response to a second gating signal;

a first path for applying said first gating signal to said first gating means;

a second path for applying said second gating signal to said second gating means;

a second external terminal for receiving a first control signal from outside of said data processing apparatus;

a third external terminal for receiving a second control signal from outside of said data processing apparatus;

first control means coupled to said first path for generating said first gating signal in response to either one of said first control signal received at said second external terminal and a reading signal generated within said data processing apparatus, said first control means transferring said first gating signal to said first path; and second control means coupled to said second path for generating said second gating signal in response to either one of said second control signal received at said third external terminal and a writing signal generated within said data processing apparatus, said second control means transferring said second gating signal to said second path.

2. An input-output interface circuit as claimed in claim 1, wherein said first control means includes a first gating means for receiving said first control signal and a first timing signal, and a second gating means for receiving said reading signal and a second timing signal which is generated at a different timing from said first timing signal.

3. An input-output interface circuit as claimed in claim 1, wherein said second control means includes a third gating means for receiving said second control signal and a third timing signal, and a fourth gating means for receiving said writing signal and a fourth timing signal which is generated at a different timing from said third timing signal.

4. An interface circuit in a data processing apparatus containing an instruction decoder and means for sending data outside of said data processing apparatus via at least one output terminal and for receiving data transferred from the outside of said data processing apparatus through at least one input terminal, said interface circuit comprising first means for transferring data outside of said data processing apparatus via said one output terminal, second means for transferring data received from said iput terminal into said data processing apparatus, third means for activating said first means during a predetermined first period in response to a reading signal produced by said instruction decoder in said data processing apparatus in order to transfer data to the outside of said data processing apparatus via said output terminal, fourth means for activating said second means during a predetermined second period in response to a writing signal produced by said instruction decoder to transfer data received from said input terminal into said data processing apparatus, fifth means for compulsorily activating said first means during a period which is different from said predtermined first period in response to a first control signal received from outside said data processing apparatus via a first external terminal to transfer data in said data processing apparatus to the outside of said data processing apparatus via said output terminal, and sixth means for compulsorily activating said second means during a period which is different from said predetermined second period in response to a second control signal received from outside said data processing apparatus via a second external terminal to transfer data received from said input terminal into said data processing apparatus.

5. A data processing apparatus comprising an instruction memory means for storing instructions, means for reading out the stored instructions of said instruction memory means, decoder means for decoding instructions read out of said instruction memory means, executing means for executing a program responsive to the decoded instructions, port means for sending data to the outside of said data processing apparatus through at least one external terminal and for receiving data into said data processing apparatus from the outside of said data processing apparatus, timing control means for producing first through fourth successive control signals, a first means for applying said first control signal to said instruction memory means, said instruction memory means being activated during a period of said first control signal, a second means for applying said second control signal to said decoder means, said decoder means being activated during a period of said second control signal, a third means for applying said third control signal to said executing means, said executing means being activated during a period of said third control signal, a fourth means for applying said fourth control signal to said port means, said port means being activated during a period of said fourth control signal, control means for activating said port means during the period of said first control signal in response to a signal supplied from outside said data processing apparatus via an additional external terminal, and means for inhibiting an activation of said memory means during the period of said first control signal when said control means activates said port means in response to the signal supplied from the outside of said data processing apparatus via said additional external terminal.

6. A data processing apparatus comprising a memory means for storing instructions therein, means for reading out the stored instructions of said memory means, decoder means for decoding instructions read out of said memory means, executing means for executing a program response to the decoded instructions, port means for sending data to the outside of said data processing apparatus through at least one external terminal and for receiving data into said data processing apparatus from the outside of said data processing apparatus, timing control means for producing first through fourth successive control signals, a first means for applying said first control signal to said memory means, said memory means being activated during a period of said first control signal, a second means for applying said second control signal to said decoder means, said decoder means being activated during a period of said second control signal, a third means for applying said third control signal to said executing means, said executing means being activated during a period of said third control signal, a fourth means for applying said fourth control signal to said port means, said port means being activated during a period of said fourth control signal, and control means for activating said port means during the period of said first control signal in response to a signal supplied from the outside of said data processing apparatus via an additional external terminal to transfer data from the inside of said data processing apparatus to the outside of said data processing apparatus through said at least one external terminal during a period of said first control signal.

* * * * *